US008297090B2

(12) United States Patent
Fong

(10) Patent No.: US 8,297,090 B2
(45) Date of Patent: Oct. 30, 2012

(54) THEFT PREVENTION DEVICE

(75) Inventor: Gary M. Fong, Kelowna (CA)

(73) Assignee: Gary Fong Photographic, Inc., Kelowna BC (CA)

( * ) Notice: Subject to any disclaimer, the term of this patent is extended or adjusted under 35 U.S.C. 154(b) by 227 days.

(21) Appl. No.: 12/709,273

(22) Filed: Feb. 19, 2010

(65) Prior Publication Data

US 2011/0203327 A1 Aug. 25, 2011

(51) Int. Cl.
*F16B 41/00* (2006.01)

(52) U.S. Cl. .................. 70/232; 70/14; 70/58; 248/551; 411/910

(58) Field of Classification Search ................ 70/14, 58, 70/416, 229, 230, 232; 411/910; 248/551–553
See application file for complete search history.

(56) References Cited

U.S. PATENT DOCUMENTS

| | | | | |
|---|---|---|---|---|
| 3,672,190 | A * | 6/1972 | Palazzolo | 70/58 |
| 3,910,079 | A * | 10/1975 | Gassaway | 70/58 |
| 4,022,037 | A * | 5/1977 | Walters | 70/232 |
| 4,081,979 | A * | 4/1978 | Dawson | 70/58 |
| 4,376,544 | A * | 3/1983 | Sette et al. | 280/507 |
| 4,777,812 | A * | 10/1988 | Haugen | 70/232 |
| 4,794,769 | A * | 1/1989 | Persons | 70/232 |
| 4,819,463 | A * | 4/1989 | Jacobs | 70/14 |
| 4,856,305 | A * | 8/1989 | Adams | 70/58 |
| 5,201,202 | A * | 4/1993 | Kam | 70/168 |
| 5,255,545 | A * | 10/1993 | Wheeler | 70/232 |
| 5,421,667 | A * | 6/1995 | Leyden et al. | 403/300 |
| 5,487,523 | A * | 1/1996 | Ingram et al. | 248/551 |
| 5,651,651 | A * | 7/1997 | Spencer | 411/372.6 |
| 5,740,685 | A * | 4/1998 | Daoud | 70/164 |
| 6,155,088 | A * | 12/2000 | Murray et al. | 70/58 |
| 6,328,514 | B1 * | 12/2001 | Shoen | 411/374 |
| 6,758,069 | B2 * | 7/2004 | Derman | 70/58 |
| 6,820,362 | B1 * | 11/2004 | Petrus | 42/70.11 |
| 7,299,668 | B1 * | 11/2007 | Lu | 70/58 |
| 7,487,652 | B2 * | 2/2009 | Marszalek et al. | 70/58 |
| 7,614,264 | B2 * | 11/2009 | McGettrick | 70/14 |
| 7,640,772 | B2 * | 1/2010 | Johnson | 70/2 |
| 7,971,458 | B2 * | 7/2011 | Gilbert | 70/58 |
| 8,037,723 | B2 * | 10/2011 | Fong | 70/58 |
| 8,096,153 | B2 * | 1/2012 | Vogan | 70/58 |
| 2007/0227206 | A1 * | 10/2007 | Stone | 70/232 |

OTHER PUBLICATIONS

Internet: http://www.manfrotto.com/; Manfrotto products; 030AT Anti Theft Camera Plate; 1 page, Mar. 1, 2010.

* cited by examiner

*Primary Examiner* — Suzanne Barrett
(74) *Attorney, Agent, or Firm* — Christie, Parker & Hale, LLP

(57) ABSTRACT

A theft prevention device includes a base having body with a pair of side walls; a base protrusion protruding from an edge of the body, the base protrusion having a base protrusion opening; and a fastener opening configured to receive a fastener for coupling the base to an external device; and a sleeve adapted to mate with the base, the sleeve having a bottom wall; a pair of side walls extending from the bottom wall; an end wall extending from the bottom wall and between the side walls, the end wall having an end wall slot adapted to receive the base protrusion; and a sleeve protrusion protruding from an edge of the sleeve and having a sleeve protrusion opening configured to be substantially aligned with the base protrusion opening when the base protrusion is inserted through the end wall slot.

16 Claims, 7 Drawing Sheets

THEFT PREVENTION DEVICE

FIELD

Embodiments of the present invention generally relate to a theft prevention device, and more specifically, to a theft prevention device adapted to attach to a camera.

BACKGROUND

Cameras for taking photographs are relatively expensive and desirable pieces of electronic equipment. Due to their relatively small size, cameras can be stolen fairly easily if left unattended for even a brief period of time, particularly at gatherings attended by a large number of people, such as weddings, concerts or sporting events. Additionally, while many cameras are quite small, it is still not always convenient for an owner to carry the camera around on his or her person. Rather, the owner may want to set the camera down for a period of time, and yet a safe place to store the camera may not always be available.

SUMMARY

According to one embodiment of the present invention, a theft prevention device is provided including a base having a body having a pair of side walls; a base protrusion protruding from an edge of the body, the base protrusion having a base protrusion opening; and a fastener opening configured to receive a fastener for coupling the base to an external device; and a sleeve adapted to mate with the base, the sleeve having a bottom wall; a pair of side walls extending from the bottom wall; an end wall extending from the bottom wall and between the side walls, the end wall having an end wall slot adapted to receive the base protrusion; and a sleeve protrusion protruding from an edge of the sleeve and having a sleeve protrusion opening configured to be substantially aligned with the base protrusion opening when the base protrusion is inserted through the end wall slot.

In one embodiment, a height of the end wall of the sleeve is greater than a height of the side walls of the sleeve and the fastener opening is substantially covered by the bottom wall when the base is coupled to the sleeve. Further, each of the side walls of one of the base and the sleeve may have a rail protruding therefrom and each of the side walls of the other of the base and the sleeve has a groove configured to receive the rail to couple the sleeve and the base together.

In one embodiment, the theft prevention device also includes a fastener, such as a screw, inserted through and protruding from the fastener opening. Further, the end wall may be configured to contact a corresponding wall of the external device to substantially prevent rotation of the sleeve with respect to the external device when the theft prevention device is coupled to the external device.

In another embodiment, the base protrusion further includes a slotted opening, wherein the insert protrusion further comprises a second base protrusion opening, wherein the slotted opening is configured to be generally aligned with the second base protrusion opening when the base is coupled to the sleeve.

DETAILED DESCRIPTION OF THE INVENTION

In general, a theft prevention device is provided and, in one embodiment, is adapted to be coupled to a camera body, thereby allowing a lock to be attached to the theft prevention device to lock the camera to any appropriate structure. More specifically, the theft prevention device is a sturdy, rigid structure that provides an opening extending from the camera through which a lock can be inserted and, when locked, cannot be easily removed from the camera. The theft prevention device is relatively lightweight and easily attachable and detachable from the camera under the appropriate circumstances (i.e., when a lock is not coupled to the device).

Figure 1:
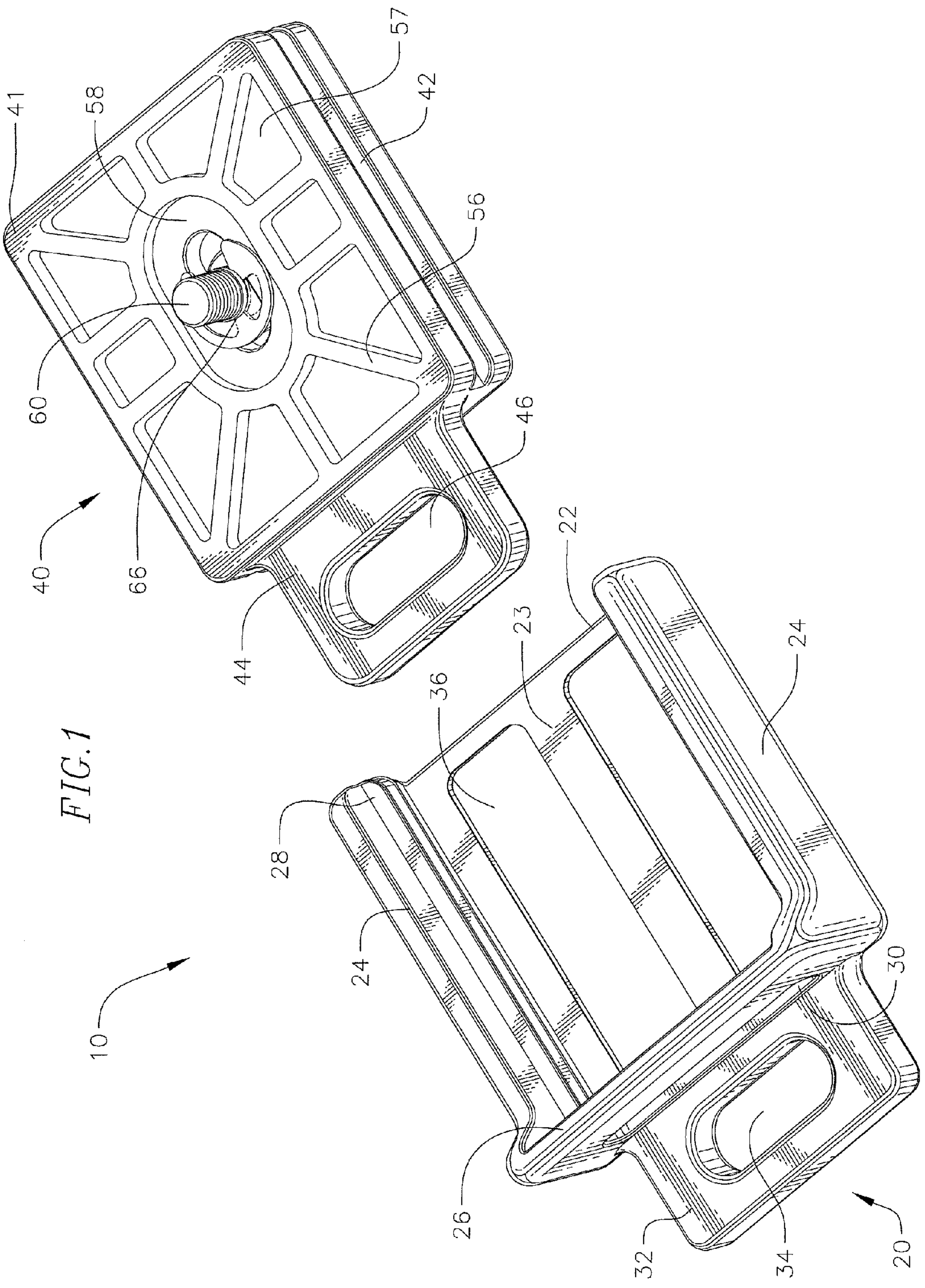
FIG. 1 is an orthogonal view of a theft prevention device according to an embodiment of the present invention.
Figure 2:
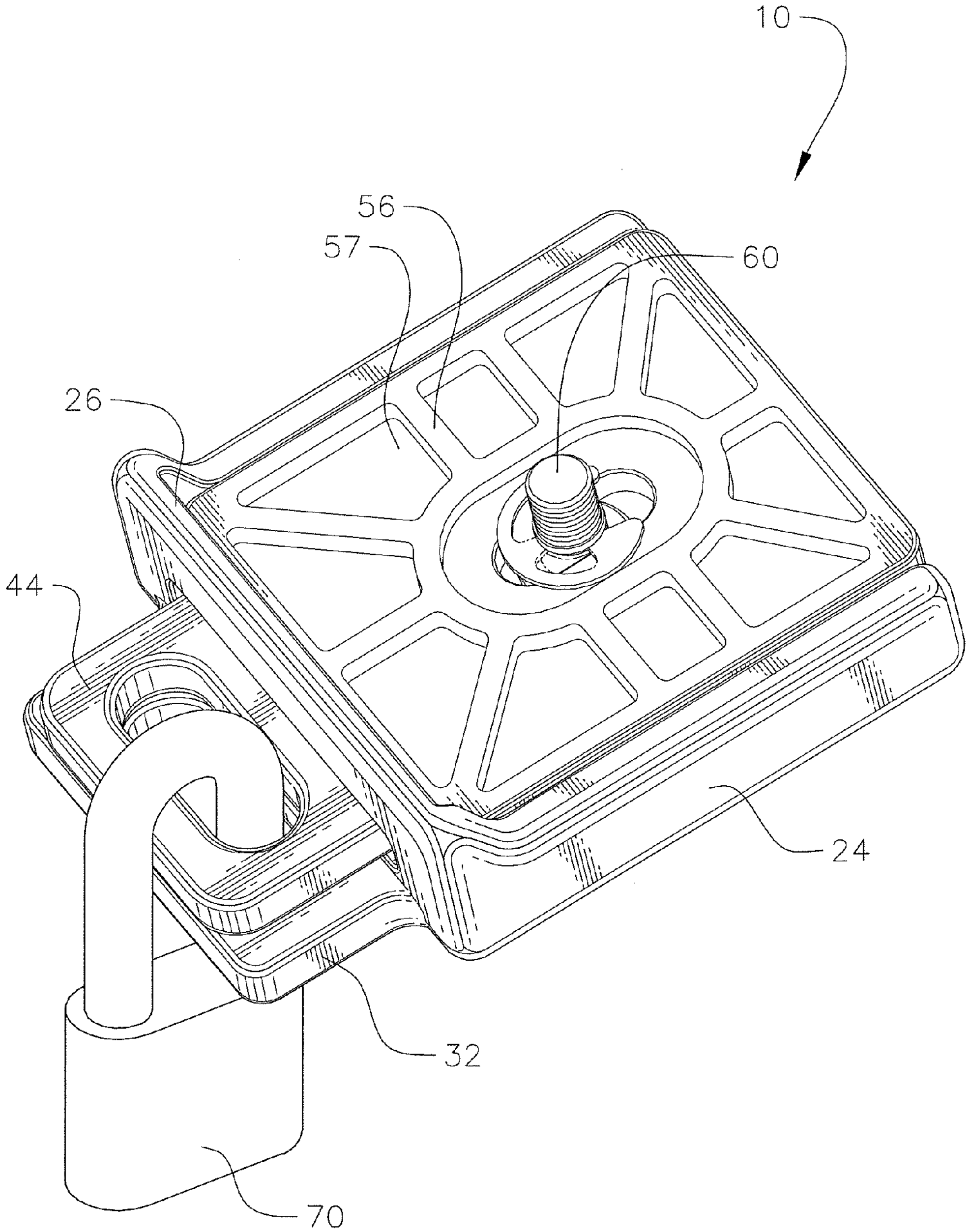
FIG. 2 is an orthogonal view of the theft prevention device of FIG. 1 after the device has been assembled and locked.
Figure 3:
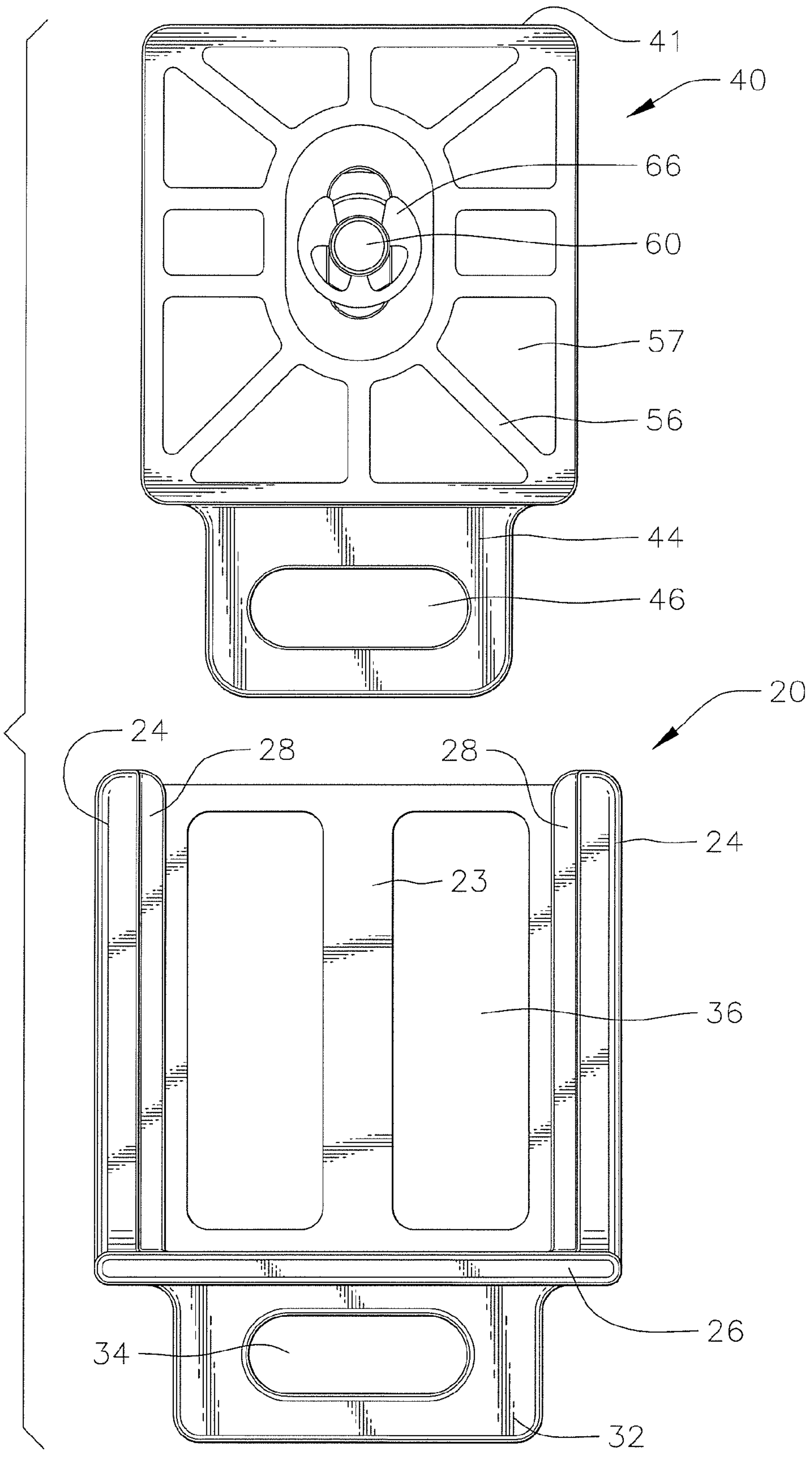
FIG. 3 is a top view of the theft prevention device of FIG. 1.

With reference now to FIGS. 1-3, one embodiment of a camera theft prevention device 10 includes a sleeve 20 and a base 40 configured to be coupled to the sleeve, as described in more detail below. When coupled together, the sleeve 20 and the base 40 form a theft prevention device attachable to a camera and provide an opening through which a lock can be inserted. Additionally, when the theft prevention device 10 is secured by a lock, the theft prevention device is difficult to be uncoupled from the camera or from any other external device to which it may be attached. In an exemplary embodiment, the sleeve 20 and the base 40 are made of metal, a durable polymer resin material, or another suitable material such that the theft prevention device 10 is not easily fracturable or otherwise easily detachable from the camera when the theft prevention device is locked. For example, the theft prevention device may be made from acrylonitrile butadiene styrene (ABS) or polycarbonate.

Figure 7:
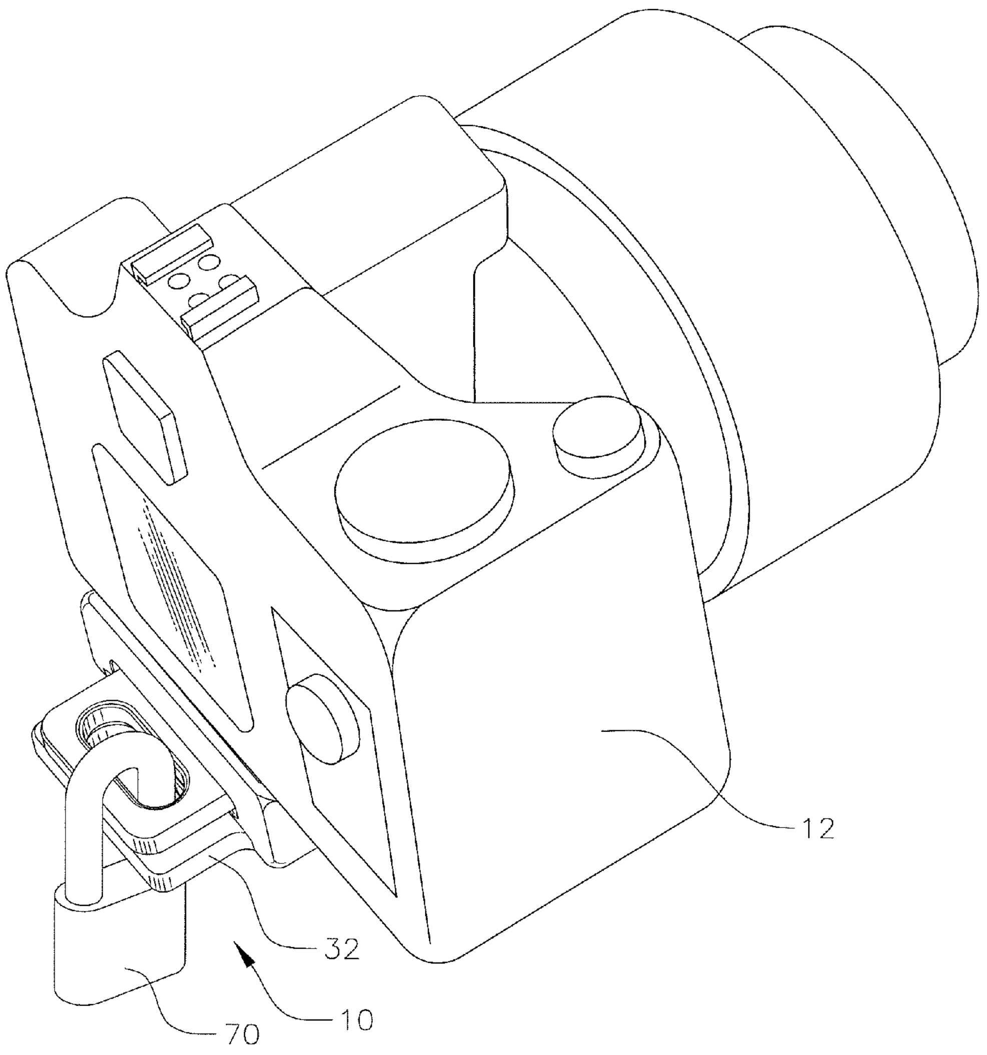
FIG. 7 is an orthogonal view of the theft prevention device of FIG. 1 coupled to a camera and having a lock attached thereto.

The sleeve 20 includes a bottom wall 22, a pair of side walls 24 extending from respective side edges of the bottom wall, and an end wall 26 extending from an end edge of the bottom wall. As defined herein, "bottom" or "lower" refers to a direction or orientation of the theft prevention device that is distal to a camera body 12 when the theft prevention device is attached to the camera and "upper" or "top" refers to a direction or orientation of the theft prevention device that is proximal to a camera body when the theft prevention device is attached to the camera (FIG. 7). Such directions and orientations are also generally consistent with the orientations of the theft prevention device as shown in the figures.

As shown in FIG. 1, the bottom wall 22 provides a support structure for the sleeve 20. In one embodiment, the bottom wall 22 includes a fastener cover portion 23 that includes a generally central portion of the bottom wall and that extends over a fastener 60 coupling the theft prevention device 10 to a camera, as described below. The fastener cover portion 23 prevents easy access to the fastener 60 when the sleeve 20 and the base 40 are locked together, thereby ensuring the security of the camera coupled to the theft prevention device 10.

The bottom wall 22 may further include one or more openings 36 to minimize the weight of the sleeve 20 while allowing the bottom wall to maintain a sufficient structural integrity to adequately support the theft prevention device 10. In the embodiment as shown in FIG. 1, the bottom wall 22 includes two openings 36. As will be appreciated, the bottom wall 22 may be a continuous surface and the openings are optional.

With continued reference to FIG. 1, the side walls 24 and the end wall 26 generally form a rectangular C-shape extending substantially perpendicularly from three edges of the bottom wall and providing an open side through which the base 40 can slide to engage the sleeve 20, as described below. Each of the pair of side walls 24 includes a rail 28 protruding therefrom, the rail configured to be coupled to a corresponding groove 42 on the base 40 to secure the base to the sleeve 20. In one embodiment, the rail 28 extends along substantially an entire length of the side wall 24, although it will be appreciated that the rail 28 could extend along only a portion of the length of the side wall and also that the rail may be segmented into a plurality of sections while still sufficiently being able to couple the base 40 to the sleeve 20. In another embodiment, the side walls 24 of the sleeve 20 may include the grooves and the base 40 may include the rails for coupling the sleeve to the base. Further, it will be appreciated that other structures for coupling the sleeve 20 to the base 40 may be used, such as latches, detents, a tongue and groove, and the like.

Figure 8:
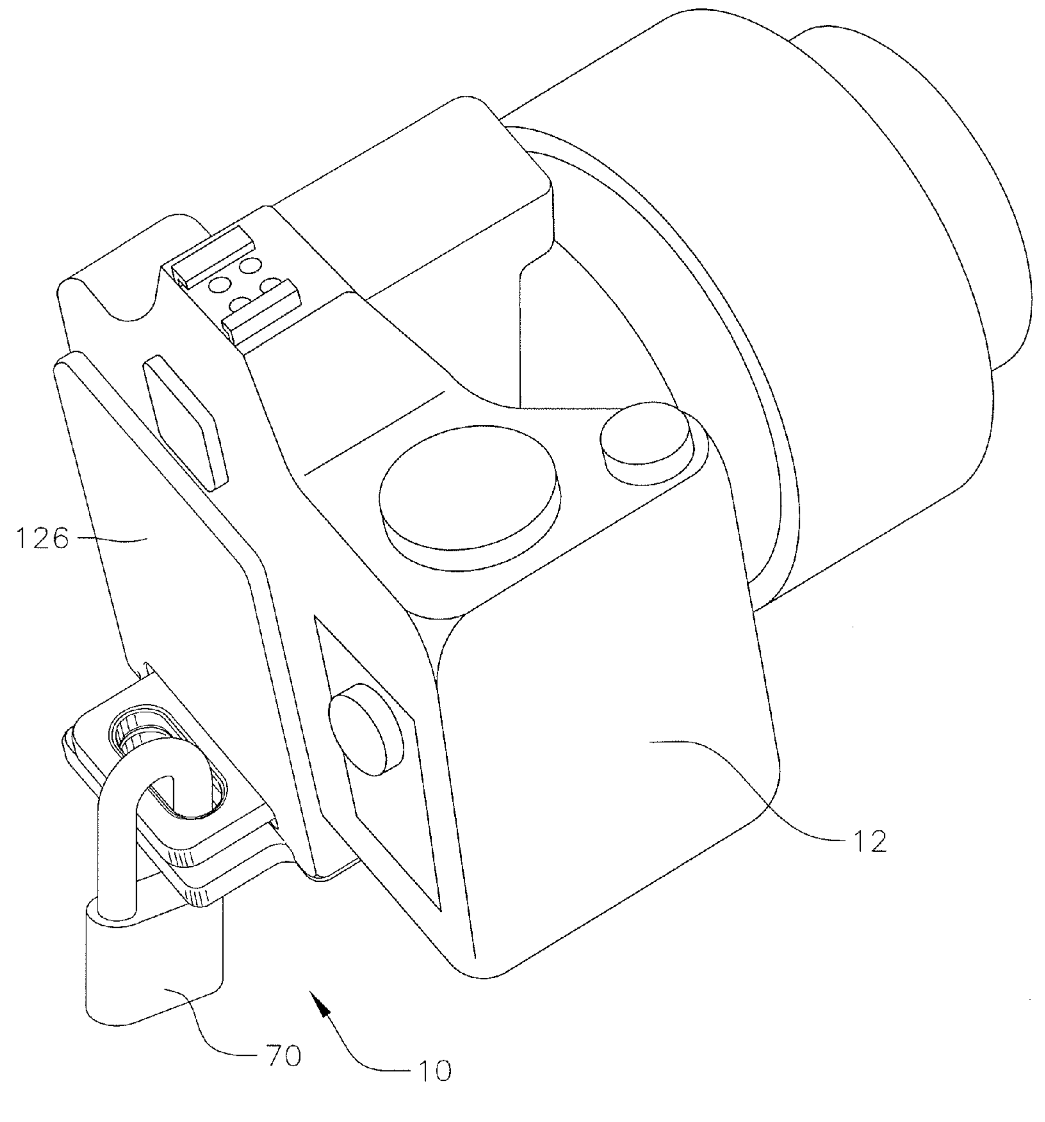
FIG. 8 is an orthogonal view of the theft prevention device of another embodiment of the present invention coupled to a camera and having a lock attached thereto.

The end wall 26 is integral with and extends between the pair of side walls 24. In one embodiment, a height of the end wall 26 is greater than a height of the side walls 24 such that the end wall can extend along a surface of a camera to prevent rotation of the sleeve 20 with respect to the camera, thereby preventing uncoupling of the theft prevention device from the camera by unthreading the fastener, as described below. Further, with respect to FIG. 8, in an alternate embodiment, the end wall 126 may be configured to at least partially, if not entirely, cover a display screen commonly found on digital cameras to which the theft prevention device is attached. It will be appreciated that the end wall 126 could also be sized to cover the entire rear surface of the camera 12, including the entire display screen and any buttons on the rear surface to effectively prevent viewing of photos stored on a memory card in the camera and further to prevent tampering of the camera settings.

With reference again to FIG. 1, the end wall 26 includes an end wall slot 30 configured to allow a base protrusion 44 to protrude therethrough, as described below. The end wall slot 30 is oriented on the end wall 26 such that when the base 40 is coupled to the sleeve 20, the base protrusion can extend through the end wall slot.

A sleeve protrusion 32 extends from the end wall 26 and, in one embodiment, the sleeve protrusion is below the end wall slot 30. The sleeve protrusion 32 has a sleeve opening 34 configured to be aligned with a base opening 46 and sized to receive a lock for locking the theft prevention device 10, as described in more detail below. The sleeve protrusion 32 is sized and structured sufficiently to prevent it from being easily damaged or broken even under extreme pressure, thereby allowing it to remain intact in case of an attempt to break the protrusion and steal the camera to which the theft prevention device 10 is attached.

Figure 5:
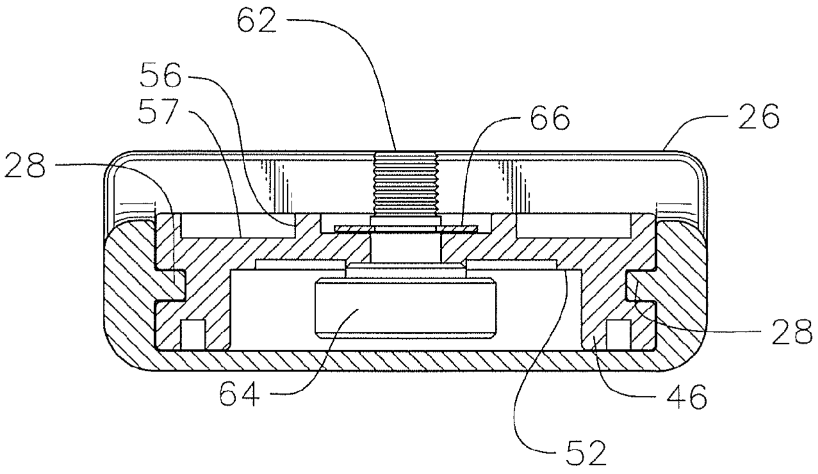
FIG. 5 is a front sectional view of the theft prevention device of FIG. 1.

With continued reference to FIG. 1, the base 40 is configured to be coupled to the sleeve 20 and also to be coupled to the camera 12 (FIG. 7). As shown in the figures, the base 40 has a substantially rectangular shaped body 41 with each of the two side edges having a groove 42 extending thereon, each groove configured to mate with a corresponding rail 28 on the side wall 24 of the sleeve 20. In one embodiment, the base 40 can be coupled to the sleeve 20 by sliding the grooves 42 along the rails 28 of the sleeve. With reference also now to FIGS. 2 and 5 showing the base 40 coupled to the sleeve 20, the base is sized to be substantially flush with edges of the sleeve to form a rigid compact structure.

The base protrusion 44 protrudes from an end edge of the base 40, the end edge corresponding to the end wall 26 of the sleeve when the base is coupled to the sleeve 20 such that the end edge abuts the end wall 26 and the base protrusion protrudes through the end wall slot 30. The base protrusion 44 has a base opening 46 configured to be aligned with the sleeve opening 34 when the base 40 is coupled to the sleeve 20 to receive a lock, as described in more detail below.

The base 40 further includes a fastener opening 50 (see FIG. 4) configured to receive a fastener 60 for coupling the theft prevention device 10 to a camera. In one embodiment, the fastener 60 is a screw adapted to be threaded to a tripod recess that is often found on cameras to attach the camera to a tripod using a similar kind of fastener. Since the tripod recess area is reinforced to prevent uncoupling of a tripod and a camera, the tripod recess is an adequate place for the attachment of the theft prevention device 10. However, it will be understood that the theft prevention device 10 could be outfitted with one of a variety of types of fasteners that could be coupled to any appropriate place on the camera. Additionally, a camera could be customized to include a place to which a fastener could be attached.

Figure 4:
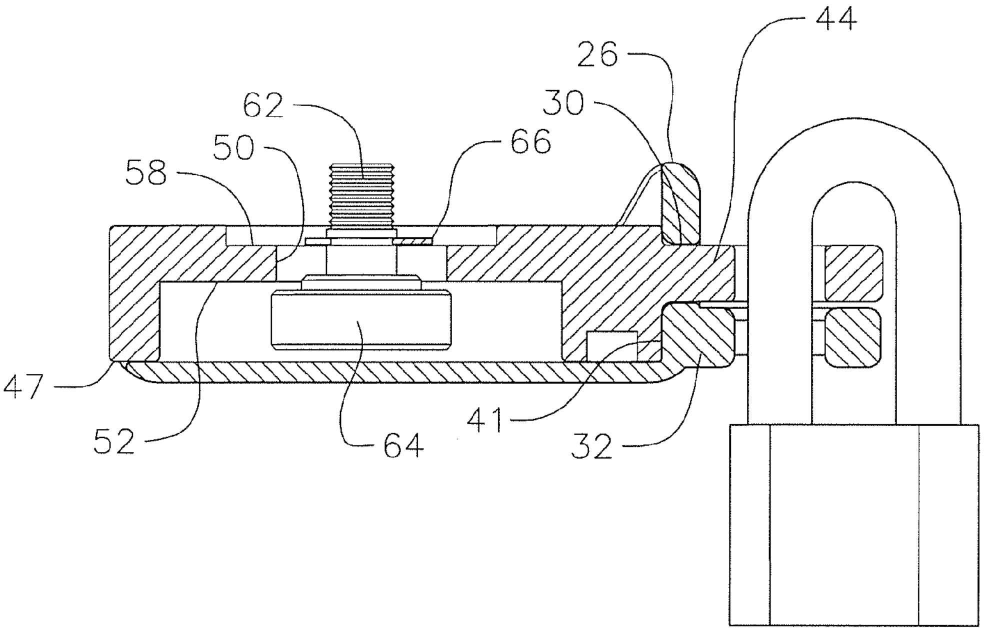
FIG. 4 is a side sectional view of the theft prevention device of FIG. 1.

With reference also to FIGS. 4 and 5, a bottom surface 47 of the base 40 includes a bottom recess 52 configured to receive the fastener 60. The bottom recess 52 has a depth sufficient to ensure that the fastener 60 is flush with or recessed from the bottom surface 47 such that the fastener does not interfere with coupling the base 40 into the sleeve 20 and to allow the fastener to be covered by the fastener cover portion 23 to prevent undesired uncoupling of the fastener from the camera 12.

A top surface of the base 40 includes ridges 56 arranged in a pattern around the fastener opening 50 and forming a plurality of recesses 57. The ridges 56 and recesses 57 allow the theft prevention device 10 to be securely attached to the camera when a coupling force is applied by the fastener and provide resistance against rotation of the device. In one embodiment, the ridges are arranged to form a central recess 58 around the fastener opening 50. As will be appreciated, the ridges 56 are optional, and the top surface may be merely roughened or may even be smooth without departing from the spirit of the invention.

As noted above, the fastener 60 may be a screw having a body 62 configured to be inserted through the fastener opening 50 and a head 64 configured to abut the surface of the central recess 58. Once the fastener 60 has been inserted through the fastener opening 50, a fastener catch 66 may be inserted around threads of the body 62 to abut a surface of the base. The fastener catch 66 maintains the fastener 60 within the fastener opening 50 even when the base 40 is oriented with the head 64 toward the ground and when the base is not coupled to a camera, thus preventing the fastener from disengaging from the base.

Figure 6:
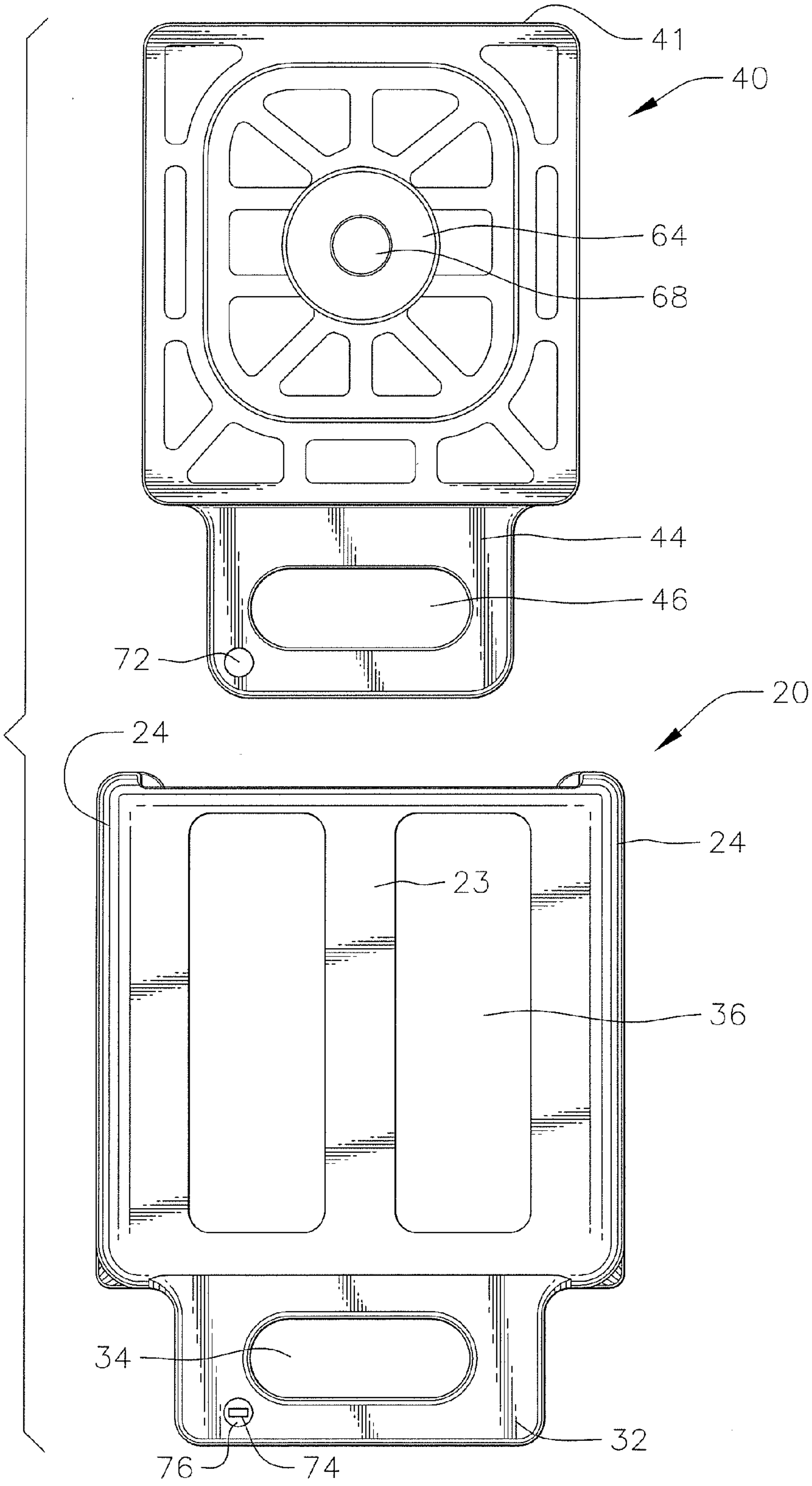
FIG. 6 is a bottom view of a theft prevention device of FIG. 1 according to another embodiment of the present invention.

In one embodiment as shown in FIG. 6, the head 64 of the fastener 60 includes a threaded recess 68 configured to receive an additional fastener, thereby allowing a camera to which the base 40 has been coupled to be able to attach to another external device, such as a tripod. In one embodiment, the additional fastener may have substantially the same structure as the fastener 60. As will be appreciated, to allow the additional fastener to be attached to the fastener 60, the base 40 is used without the sleeve 20 because otherwise the threaded recess 68 would be covered by the sleeve.

With reference to FIG. 6, in one embodiment, the theft prevention device may further include a second set of openings adapted to receive another locking device. More specifically, the base protrusion 44 includes a relatively small circular opening 72 and the sleeve protrusion 32 includes a slotted opening 74 with a metal backing 76 surrounding the slotted opening. In one embodiment, a diameter of the circular opening 72 is between about 0.2 and about 1 inch and the slotted opening has a length of between about 0.1 and about 0.5 inch and a width of between about 0.05 and about 0.25 inch.

When the base 40 is coupled to the sleeve 20, the slotted opening 74 is generally aligned with the circular opening 72. A cable, for example, a metal cable, having a t-bar at one end thereof can be inserted through the circular opening 72 and through the slotted opening 74 and locked to a structure to lock the base 40 and the sleeve 20 together and prevent theft of the camera to which the cable is attached. For example, a KENSINGTON® security slot may be incorporated into the theft prevention device for use with a KENSINGTON® cable.

Operation and use of an embodiment of the present invention will now be described with respect to the figures. To couple the base 40 to a camera, the fastener 60 is inserted through the fastener opening 50 and threaded into an appropriate place into the camera, such as into the tripod recess. The base 40 is oriented such that the end wall 26 and the base protrusion 54 extend past an edge of the camera, thereby preventing rotation of the base 40 and exposing the base opening 46.

Once the base 40 is coupled to the camera, the sleeve 20 can then be coupled to the base by engaging each rail 28 of the sleeve 20 with the corresponding groove 42 of the base 40. The sleeve 20 is slid along the rails 28 until the sleeve opening 34 is substantially aligned with the base opening 46, thereby providing an opening through which a lock 70 can be inserted, as shown in FIG. 7. A lock can then be inserted through the aligned sleeve and base openings 34, 46 and can be used to lock the camera to another object. Although a standard padlock is shown as an example in the drawings, it will be appreciated that any lock having a portion that fits through the sleeve and base openings 34, 46 can be used. When the lock 70 inserted through both the aligned sleeve and base openings 34, 46, access to the fastener 60 is substantially denied by the fastener cover portion 23, and the base 40 is substantially prevented from being moved relative to the sleeve 20, thereby locking the theft prevention device 10 to the camera 12. It will be appreciated that when the lock 70 is removed from the openings 34, 46, the sleeve 20 can be slid off the base 40 to expose the fastener 60, thereby allowing the theft prevention device to be uncoupled from the camera 12. Additionally, when the sleeve 20 is not coupled to the base 40, the base can be coupled to another device, such as a tripod, by inserting a second fastener into the threaded recess 68 in the head 64 of the fastener 60.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A theft prevention device comprising:

a base comprising:

a body having a top surface and a pair of side walls and an end wall being generally perpendicular to the top surface;

a base protrusion protruding from the end wall of the body and being substantially parallel to the top surface, the base protrusion having a base protrusion opening; and a fastener opening configured to receive a fastener for coupling the base to an external device; and a sleeve adapted to mate with the base, the sleeve comprising:

a bottom wall;

a pair of side walls extending from the bottom wall;

an end wall extending from the bottom wall and between the side walls, the end wall having an end wall slot adapted to receive the base protrusion; and a sleeve protrusion protruding from an edge of the sleeve and having a sleeve protrusion opening configured to be substantially aligned with the base protrusion opening when the base protrusion is inserted through the end wall slot.

2. The theft prevention device of claim 1, wherein a height of the end wall of the sleeve is greater than a height of the side walls of the sleeve.

3. The theft prevention device of claim 1, wherein the fastener opening is substantially covered by the bottom wall when the base is coupled to the sleeve.

4. The theft prevention device of claim 1, wherein each of the side walls of one of the base and the sleeve has a rail protruding therefrom and each of the side walls of the other of the base and the sleeve has a groove configured to receive the rail to couple the sleeve and the base together.

5. The theft prevention device of claim 1, further comprising a fastener inserted through and protruding from the fastener opening.

6. The theft prevention device of claim 5, wherein the fastener is a screw.

7. The theft prevention device of claim 5, wherein a first surface of the base is recessed such that the fastener inserted through the fastener opening is flush with or recessed from the first surface.

8. The theft prevention device of claim 7, wherein the fastener protrudes from a second surface of the base opposite to the first surface.

9. The theft prevention device of claim 8, wherein the second surface is adapted to generally abut a corresponding surface on the external device when the base is coupled to the external device and wherein the second surface has ridges.

10. The theft prevention device of claim 5, wherein the fastener has a threaded recess adapted to receive a second fastener.

11. The theft prevention device of claim 1, wherein the external device is a camera.

12. The theft prevention device of claim 1, wherein the end wall is configured to contact a corresponding wall of the external device to substantially prevent rotation of the sleeve with respect to the external device when the theft prevention device is coupled to the external device.

13. The theft prevention device of claim 1, wherein the sleeve and the base are prevented from being uncoupled from each other when a lock is inserted through the aligned sleeve protrusion opening and the base protrusion opening.

14. The theft prevention device of claim 1, wherein the theft prevention device comprises metal or a polymer resin.

15. The theft prevention device of claim 1, wherein the sleeve protrusion further comprises a slotted opening and wherein the base protrusion further comprises a second base protrusion opening, wherein the slotted opening is configured to be generally aligned with the second base protrusion opening when the base is coupled to the sleeve.

16. The theft prevention device of claim 15, wherein the slotted opening has a length of between about 0.1 and about 0.5 inch and a width of between about 0.05 and about 0.25 inch.

* * * * *

UNITED STATES PATENT AND TRADEMARK OFFICE

CERTIFICATE OF CORRECTION

PATENT NO. : 8,297,090 B2
APPLICATION NO. : 12/709273
DATED : October 30, 2012
INVENTOR(S) : Gary M. Fong It is certified that error appears in the above-identified patent and that said Letters Patent is hereby corrected as shown below:

On the Title Page

| | |
|---|---|
| Item (57) Abstract, line 1 | After "having"<br>Insert -- a -- |

Signed and Sealed this
First Day of July, 2014

Michelle K. Lee
*Deputy Director of the United States Patent and Trademark Office*